Figure 4:
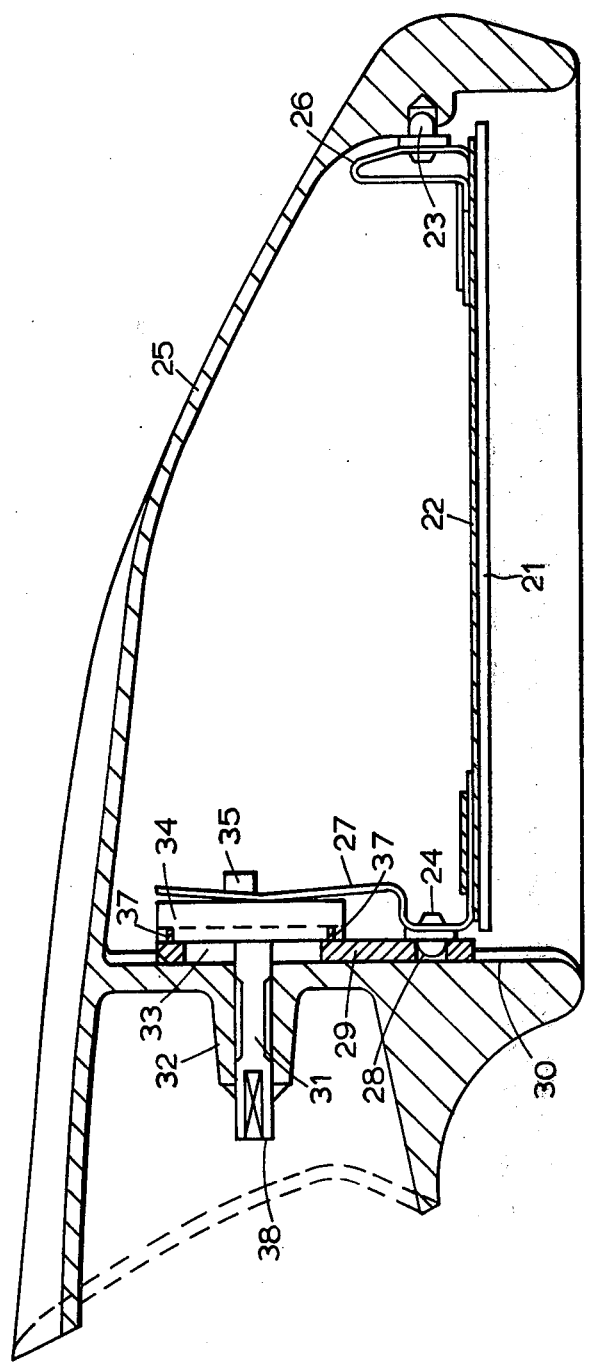

United States Patent [19]
Bottrill

[11] 3,934,489
[45] Jan. 27, 1976

[54] REAR VIEW MIRRORS FOR VEHICLES

[75] Inventor: John Bottrill, Chichester, England

[73] Assignee: Wingard Limited, Chichester, England

[22] Filed: Apr. 11, 1974

[21] Appl. No.: 460,102

[30] Foreign Application Priority Data
Apr. 12, 1973 United Kingdom............... 17545/73

[52] U.S. Cl.................................. 74/501 M; 74/86
[51] Int. Cl.² ......................................... F16C 1/00
[58] Field of Search ........................... 74/501 M, 86

[56] References Cited
UNITED STATES PATENTS

| 2,664,029 | 12/1953 | Higgins | 74/86 |
| 2,917,972 | 12/1959 | Bonaguro | 74/86 X |
| 3,170,334 | 2/1965 | Shrode | 74/501 M X |
| 3,352,524 | 11/1967 | Rossi | 74/501 M X |
| 3,466,941 | 9/1969 | Russell | 74/501 M |
| 3,659,477 | 5/1972 | Wehner | 74/501 M |

Primary Examiner—Benjamin W. Wyche
Assistant Examiner—F. D. Shoemaker
Attorney, Agent, or Firm—Scrivener Parker Scrivener and Clarke

[57] ABSTRACT

A remote control for an exterior rear view mirror for vehicles in which the mirror is adjusted within a stationary housing by rotation of a single control member coupled to the mirror head and which provides adjustment of the head in at least two planes.

4 Claims, 10 Drawing Figures

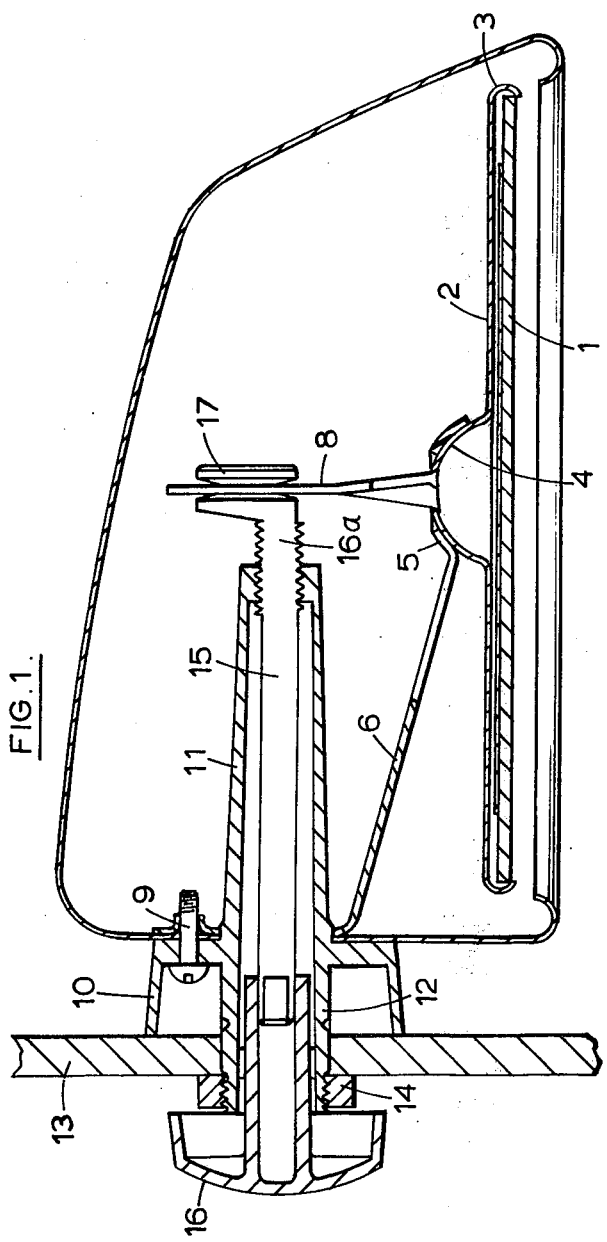

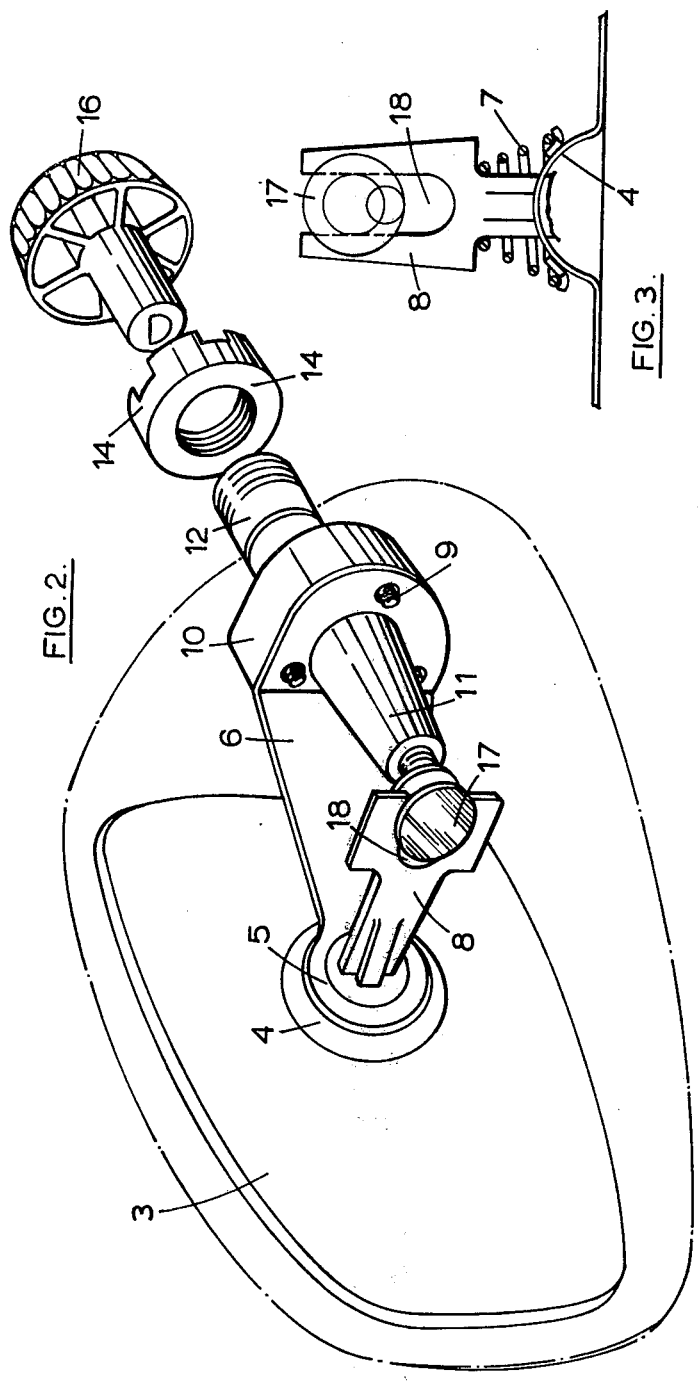

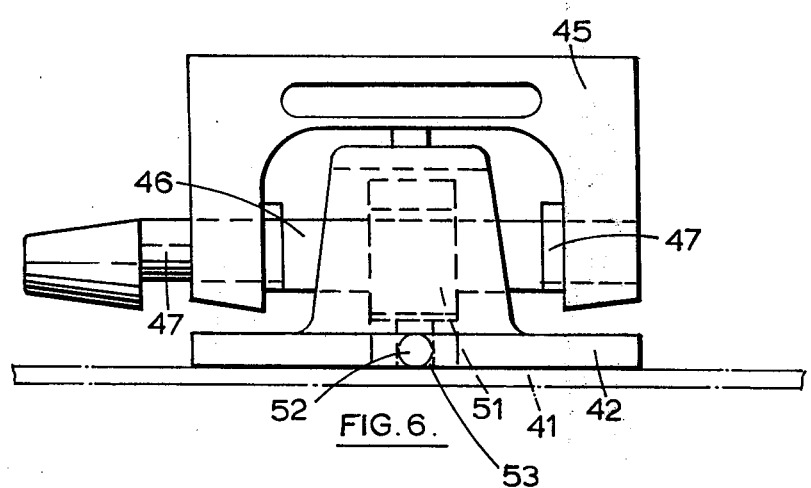

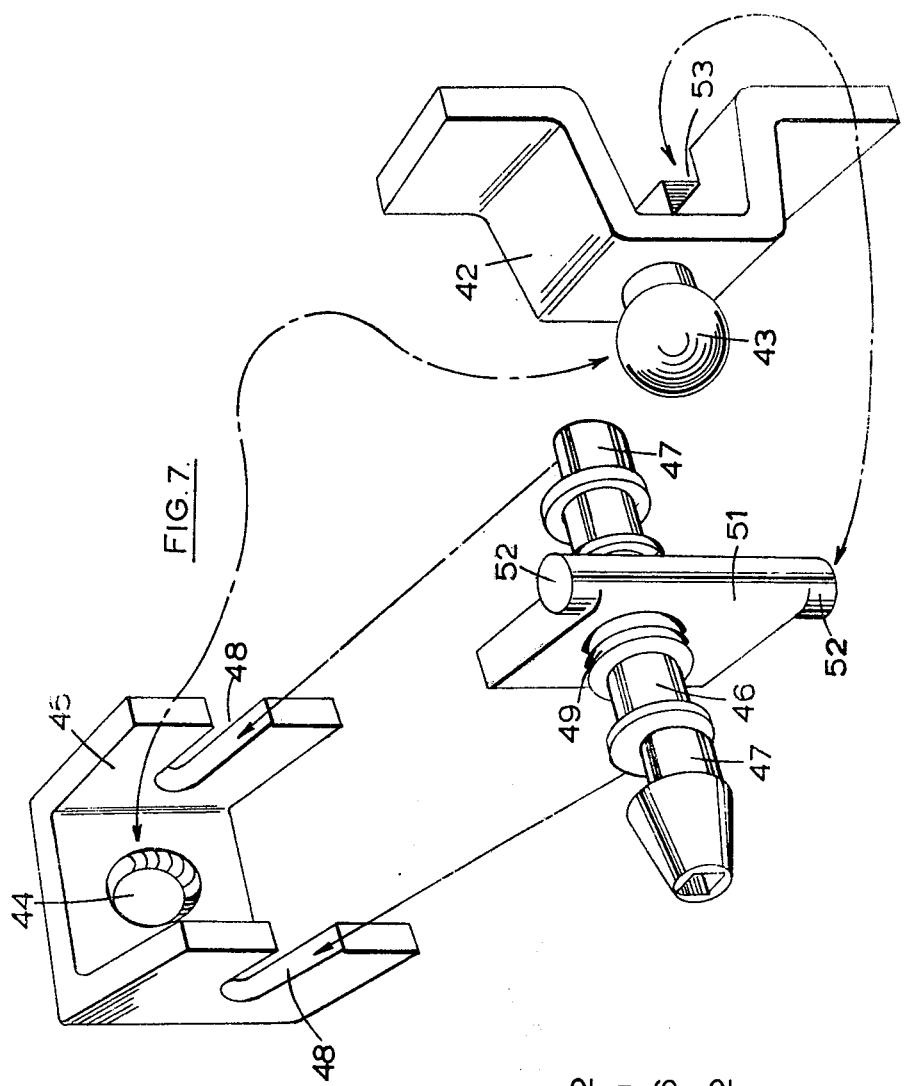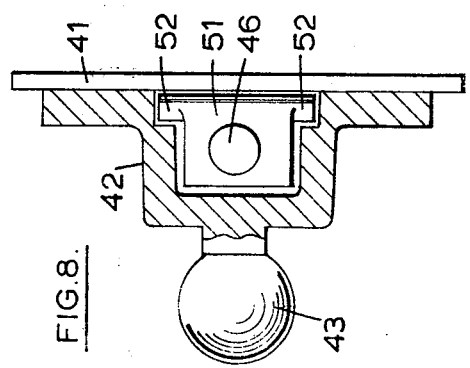

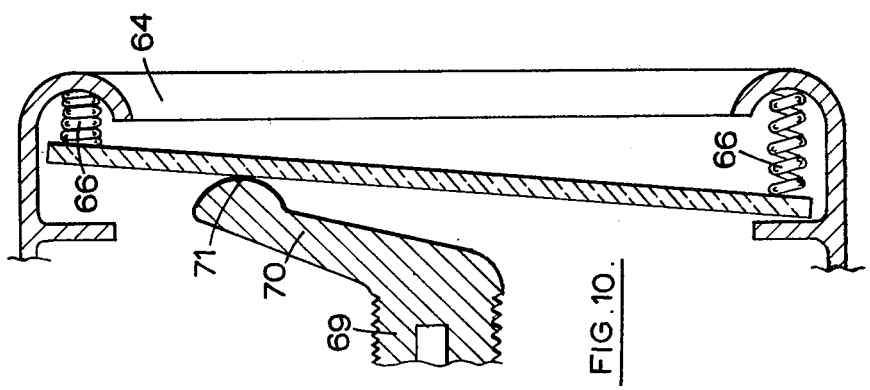
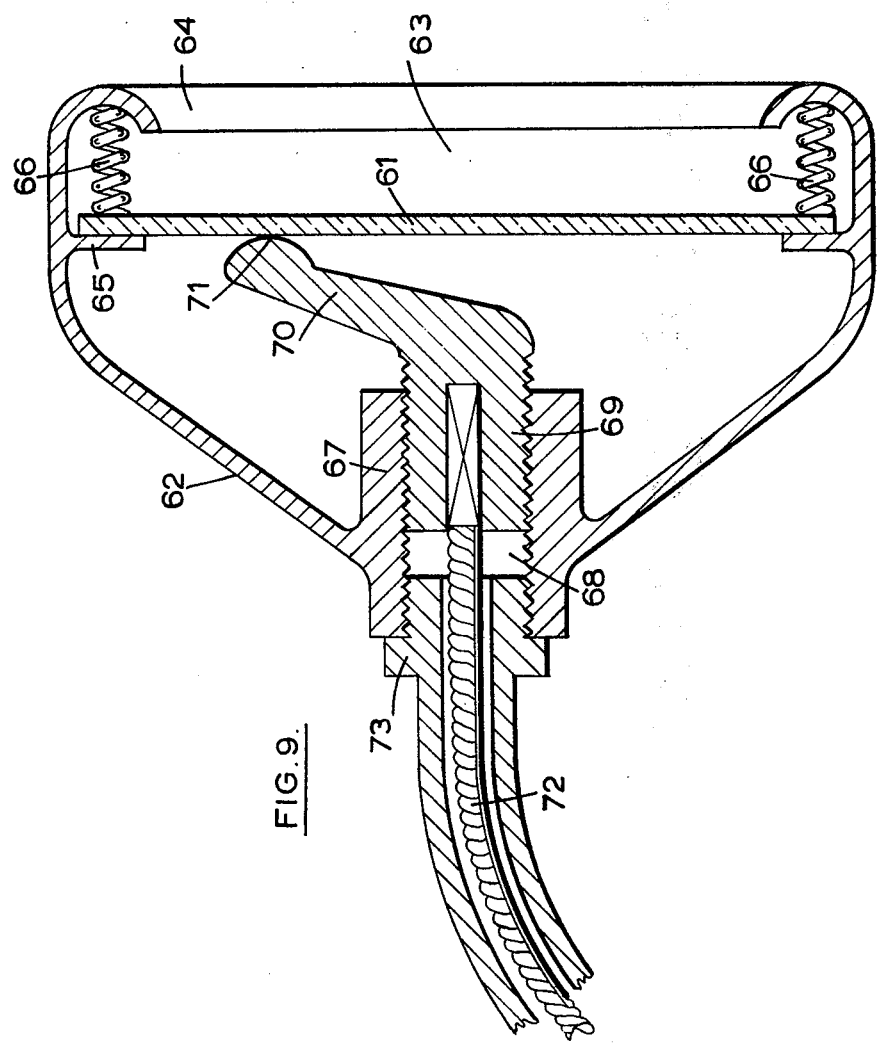

REAR VIEW MIRRORS FOR VEHICLES

This invention relates to an exterior rear view mirror for vehicles, primarily for motor vehicles, the mirror being of the type in which the angular position of the head of the mirror is adjustable from within the vehicle.

Mirrors of this kind are known, in which the mirror head is adjustable in two planes, i.e. in tilt and azimuth. It is known to do this with a single control lever or knob, for example by the use of a joystick acting through a group of three flexible cables that pass through the mounting arm of the mirror and carry plungers that bear against three symmetrically spaced points around a tilting disc on which the mirror is mounted. The use of three cables involves substantial cost, and friction problems can arise after a substantial period of use without lubrication. Also it creates problems in connection with vehicle safety regulations.

The aim of the present invention is to provide an improved form of single-knob remote control that allows the mirror to be adjusted in at least two planes.

Our invention comprises a rear view mirror of the kind set forth in which the mirror head is mounted within a stationary housing in which it is angularly adjustable by rotation of a single control member which provides scanning in at least two planes i.e. in tilt and in azimuth.

In one arrangement the control member comprises a spindle or shaft (which may be flexible) which, by its rotation effects an adjustment of the mirror head in a plane perpendicular to the axis of the spindle, that movement being repeated on each rotation of the spindle and which also has a screw-threaded engagement with a part of the mirror mounting so that rotation of the spindle also causes it to move axially and this axial movement effects an adjustment of the mirror head in a second plane.

Thus, provided the screw-threaded engagement is of relatively fine pitch, the shaft can be turned through a small arc to effect the first adjustment without significantly affecting the second. The second adjustment is effected by turning the shaft through an integral number of turns, leaving it in the same final angular position so as not to alter the first adjustment.

As only a single shaft or spindle is required to pass through the base of the mounting arm of the mirror, it is a relatively easy matter to design the mirror assembly to meet those vehicle regulations that require exterior mirrors to break off when struck. As well as the base being designed with a weak point to fracture easily, the spindle is also designed with a weak point or, better still, with a joint that comes apart easily, without leaving any objectionable or sharp residual parts. If required a flexible retaining cable can be incorporated to allow the mirror to remain attached to the vehicle after having been broken off.

In another arrangement a mirror is floatingly mounted in a housing in which it is resiliently urged towards an annular abutment and the mirror is engaged by a finger extending radially from a spindle in rotatable screw-threaded engagement with a part of the housing, which finger, as the spindle is rotated, produces a conical scanning movement of the mirror head which increases in angle as the spindle moves axially.

Several forms of rear view mirror in accordance with our invention are illustrated by way of example in the accompanying drawings in which:-

Figure 5:
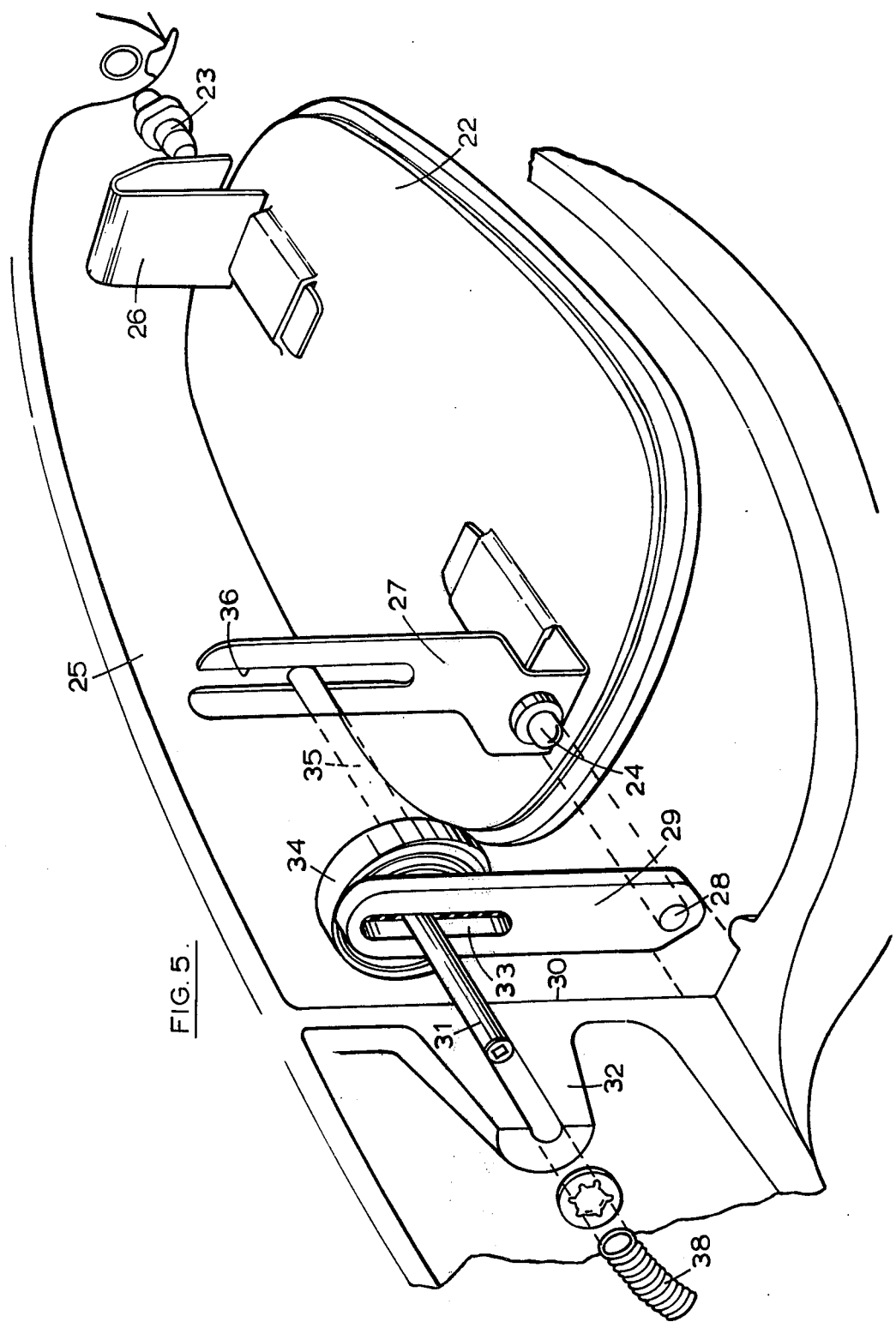

FIG. 1 is a longitudinal section of one form of adjustable mirror,

FIG. 2 is an exploded view in perspective of the component parts of the mirror shown in FIG. 1, FIG. 3 is a fragmentary view of the swivelling joint for the mirror head and the associated parts, FIG. 4 is a longitudinal section of another form of mirror, FIG. 5 is an exploded perspective view of the component parts of the mirror shown in FIG. 4, FIG. 6 is a diagrammatic plan view of a third form of mirror, FIG. 7 is an exploded perspective view of the principal parts of the mirror assembly shown in FIG. 6, FIG. 8 is a horizontal section of the mirror assembly shown in FIG. 6, FIG. 9 is a longitudinal section of yet another form of mirror, this form providing conical scanning of the mirror, and FIG. 10 is a fragmentary section similar to FIG. 9 but showing the position of the mirror in the housing after some adjustment.

In the mirror shown in FIGS. 1, 2 and 3 a mirror head comprises a reflecting glass 1 mounted in a metal backing member 2 having a peripheral lip 3 to receive the glass. On the rear face of the backing member there is a part-spherical boss 4 which is received in a complementary socket 5 in the free end of a bracket 6 rigidly secured to or forming part of a hollow mirror housing. The boss 4 is retained in frictional rocking engagement with the socket 5 by a compression spring 7 interposed between the socket and shoulders on a pressed metal lug 8 fixed to the boss and projecting from it at right angles to the plane of the mirror, the lug passing through an opening in the socket 5 of sufficient dimension to allow for adequate angular movement of the mirror head.

The housing is secured by screws 9 to a mounting 10 integral with a hollow sleeve 11 which extends into the housing, the mounting having on its outer end an aligned second sleeve part 12 which is adapted to pass through a door panel 13 in which it is secured by a nut 14. A spindle 15 having an operating knob 15 on its outer end passes axially through the sleeves 11 and 12 and incorporates a screw-threaded part 16a in screwed engagement with a reduced part of the bore at the inner end of the sleeve 11.

On the inner end of the spindle there is a grooved eccentric 17 which is received in a clearance slot 18 in the free end of the lug 8.

It will be appreciated that when the spindle is turned the eccentric rocks the mirror head to and fro in one plane about the boss 4, performing a complete cycle to opposite sides of a mean central position for each complete revolution of the spindle. At the same time each revolution displaces the spindle and therefore the free end of the lug 8 along the axis of the spindle through a distance equal to the pitch of the screw-thread thereby tilting the mirror about an axis passing through the boss 4 perpendicular to the axis of the spindle.

Thus the user first adjusts the mirror in azimuth, i.e. about this second axis, which is usually substantially vertical, by several turns of the knob 16 and then adjusts the knob angularly to the exact angular position to give the desired tilt with respect to the horizontal.

If the mirror is located in such a position on the vehicle that the knob 16 is not within easy reach of the driver the spindle can be rotated by a flexible shaft carried to a convenient point.

In the arrangement shown in FIGS. 4 and 5 a mirror glass 21 is carried by a backing plate 22 mounted to rock about an axis formed by pivot pins 23 and 24. The pin 23 is freely mounted in a recess in one end of a housing 25 and its rounded free end is received in a hole in a resilient folded metal strip 26 secured to the backing plate 22. The other pin 24 is fixed in a strip 27 secured to and extending away from the backing plate. The outer end of the pin 24 is received in a hole 28 in a cam follower bar 29 which extends at right angles to the mirror and is in sliding engagement with a wall 30 in the housing.

A spindle 31 of which the axis is parallel to the pivot axis of the mirror is rotatably mounted in a boss 32 on the outer side of the wall 30 and passes through a slot 33 in the bar 29. The inner end of the spindle carries a grooved scroll cam 34 and an eccentric peg 35. That peg is received in a slot 36 in the strip 27, and projections 37 on the inner side of the bar 29 are engaged in the groove in the cam.

The spindle is adapted to be rotated by a flexible shaft 38 from any convenient point, and on each revolution of the shaft the engagement of the peg 35 in the slot 36 rocks the mirror head about the axis formed by the pivot pins 23 and 24.

As the spindle is rotated the scroll cam progressively moves the bar 29 in a direction at right angles to the mirror head and takes with it the pivot pin 24 to adjust the mirror in a second plane at right angles to the first, the resilient mounting of the pin 23 allowing for this movement.

In the arrangement shown diagrammatically in FIGS. 6, 7 and 8 the various parts are designed to be moulded from plastics material.

A mirror head 41 is mounted on a channel shaped block 42 of which the inner end carries a ball 43 adapted to be received and to rock in a part-spherical socket 44 in the base of a U-shaped frame 45. The ball is a snapin fit in the socket. A spindle 46 has eccentric end portions 47 which are rotatably received in aligned slots 48 in the limbs of the frame 45. The central part 49 of the spindle is screw-threaded and passes through a screwthreaded bore in a nut 51 over which the block 42 fits. The block is pivotally connected to the nut 51 by projecting pegs 52 on the nut which are received in notches 53 in the block. The nut is retained in the block by the backing plate of the mirror.

Because of the eccentricity of the end portions of the spindle rotation of the spindle rocks the nut 51 and through it the block 42 and the mirror head abut the ball in one plane, this movement being repeated on each revolution.

Rotation of the screw also produces axial movement of the nut and hence angular movement of the block 42 and the mirror head in a plane at right angles to the first movement.

In a modification the block 42 and the frame 44 may be moulded in one piece in which case the ball 43 and the socket 44 can be replaced by a flexible neck connecting the parts 42 and 44.

In the arrangement shown in FIGS. 9 and 10 a mirror 61 is floatingly mounted in a housing 62 and is exposed in an opening 63 in one end of the housing. There is an inwardly curved peripheral lip 64 around the opening 63. An internally projecting annular flange 65 is formed in the casing parallel to and spaced rearwardly from the lip 64. The mirror is resiliently urged towards the flange by a ring of springs 66 located between the peripheral portion of the mirror and the lip 64.

A boss 67 having an internally screw-threaded bore 68 is integral with the rear end of the housing, the axis of the bore being at right angles to the plane of the flange 65.

A screw-threaded spindle 69 is rotatably mounted in the bore and carries on its forward end a radially projecting and forwardly inclined finger 70 of which the rounded end 71 is adapted to bear on the back of the mirror.

When the spindle is rotated it moves forwardly owing to its screw-threaded engagement with the housing and the finger 70 presses the mirror away from the flange 65 against the action of the springs 66. The point of contact of the finger with the mirror travels in a circle and is spaced from the centre of the mirror so that the mirror is moved out of its normal plane against the action of the springs as shown in FIG. 10, the point on the periphery of the mirror which is displaced for the greatest distance from the flange travelling round as the spindle is rotated. This produces conical scanning by the mirror and the angular displacement of the mirror progressively increases as the spindle moves forwardly so that the adjustment covers a very wide range.

The spindle is rotated from a convenient point by a flexible shaft 72 brought into the housing through a bush 73 screwed into the outer end of the bore 68.

The mirror may be provided with a metal back-plate or may be covered with any suitable material to prevent damage to the reflective coating by the friction of the finger 70.

Alternatively a roller may be mounted in the free end of the finger for contact with the glass.

The end of the flexible shaft is in sliding keying engagement with the spindle to allow for the axial movement of the spindle.

I claim:

1. An exterior rear view mirror for vehicles in which a mirror located within a stationary housing is adjustable by remote control wherein said mirror is floatingly mounted in a housing and exposed in an opening in one end of the housing and is resiliently urged against an internal abutment flange in the housing set in from and parallel to the opening, and the rear face of the mirror is engaged by a radial finger carried by a rotatable spindle passing through and in screw-threaded engagement with a central boss in the housing at the end remote from the opening whereby the spindle on being rotated moves axially towards the mirror glass and the finger effects a rotating displacement of the edge of the mirror away from said abutment flange through a progressively increasing angle.

2. An exterior rear view mirror for vehicles of the type wherein a mirror head is mounted in a housing for angular movement about a ball and socket joint; in combination therewith a remote control for adjusting said mirror comprising a spindle of which the axis is substantially parallel to the normal plane of the mirror, said spindle being rotatably mounted in a sleeve member rigid with the housing and with which the spindle is in screw threaded engagement, a grooved eccentric cam carried by said spindle, a lug extending from the mirror head at right angles to the axis of the spindle, said lug having a slot therein engaging said cam to effect rocking of said mirror about the ball joint in one plane on each revolution of the spindle and to rock said mirror in another plane at right angles to the first by axial movement of the spindle produced by its screw threaded engagement with the sleeve.

3. An exterior rear view mirror for a vehicle of the type wherein a mirror head is mounted for angular movement about aligned pins in a housing, in combination therewith, a remote control for adjusting said mirror comprising a lineally moveable cam follower carrying one of said pins, a spindle rotatably mounted in the housing and carrying a scroll cam operatively engaging said cam follower, an arm having a slot therein extending from the mirror head in a direction substantially at right angles to the head, said spindle also carrying a peg engaged in the slot in said arm, said peg being arranged relative to the rotational axis of said spindle that upon rotation thereof said peg rocks the mirror about the axis formed by the pins and the cam displaces the one pin in a direction substantially at right angles to the plane of the mirror head whereby adjustment of the mirror in two planes at right angles to each other is provided by rotation of the spindle.

4. In combination with an exterior rear view mirror for vehicles including a mirror head, a block carrying said mirror head and having a universal mounting means thereon, a base member connected to said mirror head through said universal mounting means, a rotatable spindle having eccentric ends working in aligned slots in said base member and having a screw threaded part, a nut located within and in rocking engagement with said block and in screw threaded engagement with the threaded part of said spindle, rotation of said spindle causing said eccentric ends to effect rocking of said head in one plane about said universal mounting means and also causing said screw threaded connection to move said head angularly about said universal mounting means in a plane at right angles to the first mentioned plane.

* * * * *